(12) United States Patent
Zhou

(10) Patent No.: US 10,161,594 B2
(45) Date of Patent: Dec. 25, 2018

(54) WALL LAMP

(71) Applicant: DONGGUAN THAILIGHT SEMICONDUCTOR LIGHTING CO., LTD, Dongguan (CN)

(72) Inventor: Wenbo Zhou, Dongguan (CN)

(73) Assignee: DONGGUAN THAILIGHT SEMICONDUCTOR LIGHTING CO., LTD, Dongguan (CN)

( * ) Notice: Subject to any disclaimer, the term of this patent is extended or adjusted under 35 U.S.C. 154(b) by 0 days.

(21) Appl. No.: 15/683,790

(22) Filed: Aug. 23, 2017

(65) Prior Publication Data
US 2018/0299096 A1 Oct. 18, 2018

(30) Foreign Application Priority Data
Apr. 18, 2017 (CN) ..................... 2017 2 0407458 U

(51) Int. Cl.
| | |
|---|---|
| *F21V 5/00* | (2018.01) |
| *F21S 8/00* | (2006.01) |
| *F21V 5/04* | (2006.01) |
| *F21V 8/00* | (2006.01) |
| *F21Y 115/10* | (2016.01) |
| *G02B 7/02* | (2006.01) |

(52) U.S. Cl.
CPC .............. *F21V 5/007* (2013.01); *F21S 8/033* (2013.01); *F21V 5/048* (2013.01); *G02B 6/003* (2013.01); *F21Y 2115/10* (2016.08); *G02B 7/02* (2013.01)

(58) Field of Classification Search
None
See application file for complete search history.

*Primary Examiner* — Jack Dinh
(74) *Attorney, Agent, or Firm* — Gokalp Bayramoglu

(57) ABSTRACT

The invention discloses a wall lamp, including a plurality of light-emitting units, a lens board, and a plurality of lens units. The plurality of lens units are mounted on one side of the lens board, and a plurality of mounting grooves are provided on the other side. The plurality of mounting grooves are provided corresponding to the plurality of lens units for accommodating the light-emitting unit. The lens unit includes a main lens surface facing the light-emitting unit. The main lens surface including a first plane, the second plane and the third plane. The main lens surface includes two planes inclined to the ground, and the light emitted by the light-emitting units cooperating with the lens is projected to the ground under the action of the main lens surface, so that the light energy can be effectively utilized and saved.

16 Claims, 6 Drawing Sheets

US 10,161,594 B2

WALL LAMP

CROSS REFERENCE TO RELATED APPLICATIONS

This application is based upon and claims priority to Chinese Patent Application No. 201720407458.8, filed on Apr. 18, 2017, the entire contents of which are incorporated herein by reference.

TECHNICAL FIELD

The present invention relates to a lighting appliance, particularly to a wall lamp.

BACKGROUND

The wall lamps are widely used in indoor and outdoor lighting and decoration as a commonly used lighting tool. The LED lamp featuring high efficiency, energy saving, safety, longevity, with compact design has become the main product in a new generation of lighting market and brings the rapid development of the industry of environmental protection and energy conservation. Most of the current wall lamps use flat-panel LED light group and converge light with a cone platform or hemispherical lens. Therefore, the light beam has a large scattering angle and cannot be effective converged, causing low light energy utilization and poor lighting effect.

SUMMARY OF THE INVENTION

In order to overcome the deficiency of the prior art, the object of the present invention is to provide a wall lamp with characteristics of good convergence, energy saving, and good illumination.

The object of the present invention is realized by using the following technical solution.

A wall lamp is mounted on a wall for illumination. The wall lamp comprises a plurality of light-emitting units, a lens board, and a plurality of lens units. The plurality of lens units are mounted on one side of the lens board, and a plurality of mounting grooves are provided on the other side of the lens board. The plurality of mounting grooves are provided corresponding to the plurality of lens units. The plurality of lens units are cooperated with the plurality of light-emitting units. The plurality of mounting grooves are provided for accommodating the plurality of light-emitting unit. Each lens unit includes a main lens surface directly facing the light-emitting unit. The main lens surface includes a first plane, a second plane, and a third plane. The second plane connects the first plane and the third plane. The first plane, the third plane, and the lens board are inclined in the same direction with respect to the wall. An inclination angle of the first plane with respect to the wall is larger than that of the lens board. An inclination angle of the third plane with respect to the wall is larger than or equal to that of the first plane, and the second plane is parallel to the lens board.

Furthermore, the lens unit further includes a plurality of circumferential lens surfaces, the plurality of circumferential lens surfaces are connected one by one as a circle, one end of each circumferential lens surface is connected to the main lens surface, and the other end of each circumferential lens surface being fixedly connected to the lens board.

Furthermore, each light-emitting unit is an LED lamp.

Furthermore, the wall lamp further includes a substrate, the plurality of light-emitting units are evenly mounted on the substrate, the substrate includes a first substrate and a second substrate, the first substrate and the second substrate is connected at an obtuse angle, a surface of the lens board on which the plurality of lens units are mounted is parallel to the first substrate, and a distance between two adjacent light-emitting units mounted on the first substrate is larger than that on the second substrate.

Furthermore, the wall lamp further comprises a housing, the housing includes a top cover and a base, the base is fixedly connected to the top cover, the lens board is fixedly connected to the top cover, the substrate is connected to an outer surface of the top cover and located between the lens board and the top cover.

Furthermore, the base comprises two side lugs and two pins. The two side lugs and the two pins are disposed oppositely on two sides of the base. The top cover includes two outer edges and two pin holes. The two outer edges and the two pin holes are disposed oppositely on two sides of the top cover. The two pins are inserted to two pin holes, respectively. The two side lugs are fixedly connected to the two outer edges by bolt, respectively.

Furthermore, the base includes a cuboid housing with an opening at one end, and the top cover is a right-angled triangular prism-shaped housing with an opening at one side.

Furthermore, the housing further includes a rubber pad. The rubber pad is mounted between the base and the top cover.

Furthermore, the wall lamp further comprises a power supply. The power supply is electrically connected to the plurality of light-emitting units. The power supply is located within the housing and fixedly connected to the housing via an L-shaped bracket.

Furthermore, the power supply includes a 40 W high voltage power supply and two 50 W power supplies. The two 50 W power supplies are located on two sides of the high voltage power supply, respectively.

Compared with the prior art, the beneficial effect of the present invention is that the main lens surface includes two planes inclined to the ground, and the light emitted by the light-emitting unit cooperating with the lens is projected toward the ground under the action of the main lens surface, so that the light energy can be effectively utilized and saved.

In the Figures: 1. housing; 11. base; 111. pin; 112. side lug; 113. first fitting hole; 12. top cover; 121. pin hole; 122. outer edge; 123. second fitting hole; 13. rubber pad; 2. power supply; 21. high voltage power supply; 22. 50 W power supply; 3. bracket; 4. substrate; 41. first substrate; 42. second substrate; 5. light-emitting unit; 6. lens board; 61. protruded texture; 7. lens unit; 71. main lens surface; 711. first plane; 712, the second plane; 713, the third plane; 72. circumferential lens surface.

DETAILED DESCRIPTION OF THE EMBODIMENTS

The present invention will be further described in conjunction with the drawings and the embodiments as below.

Figure 1:
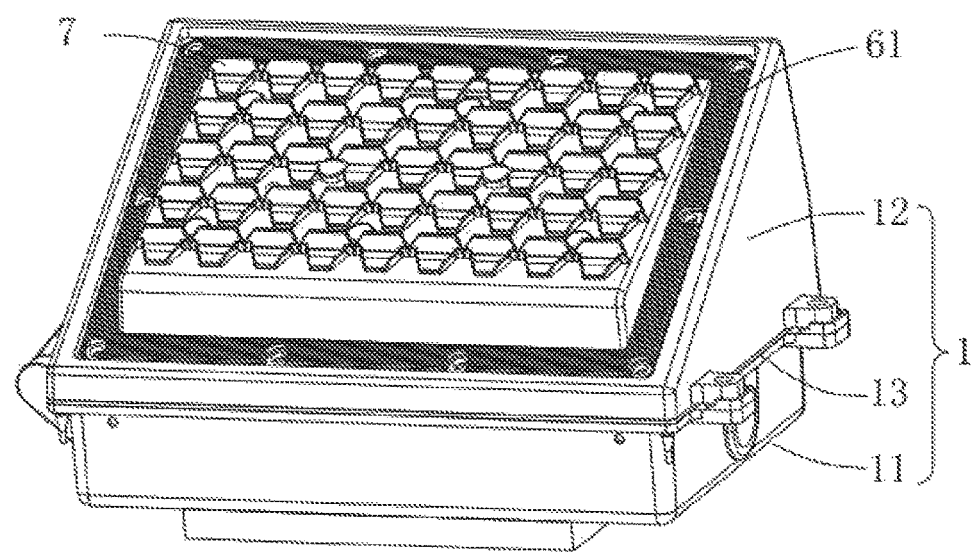
FIG. 1 is a perspective view of a wall lamp of the present invention.
Figure 2:
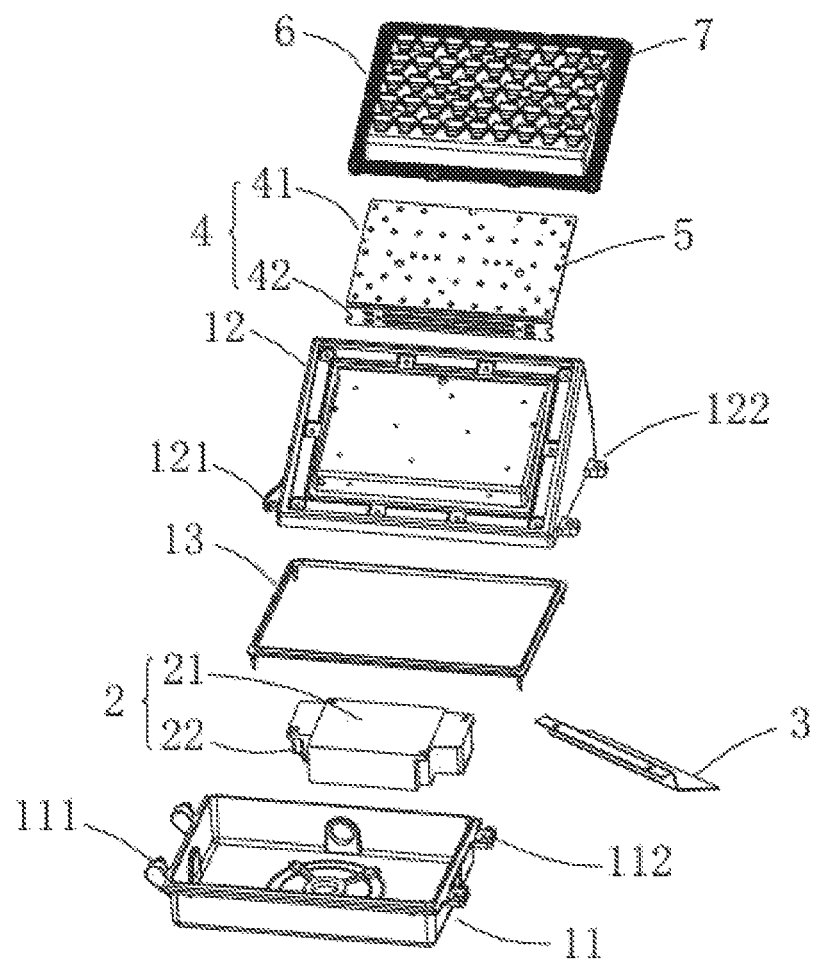
FIG. 2 is an explosive view of the wall lamp shown in FIG. 1.

As shown in FIGS. 1-2, a wall lamp includes housing 1, power supply 2, bracket 3, substrate 4, a plurality of light-emitting units 5, lens board 6, and a plurality of lens units 7.

Figure 3:
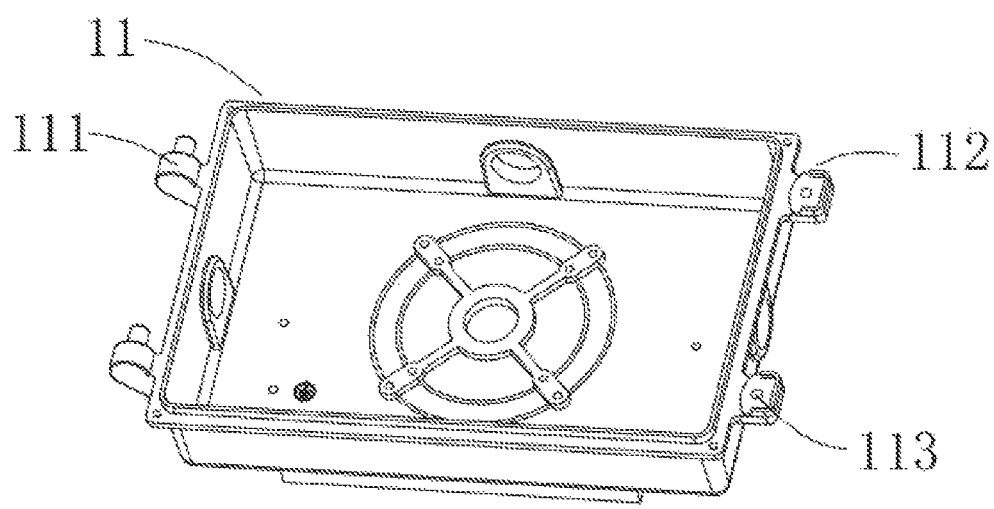
FIG. 3 is a schematic view of the base shown in FIG. 1.
Figure 4:
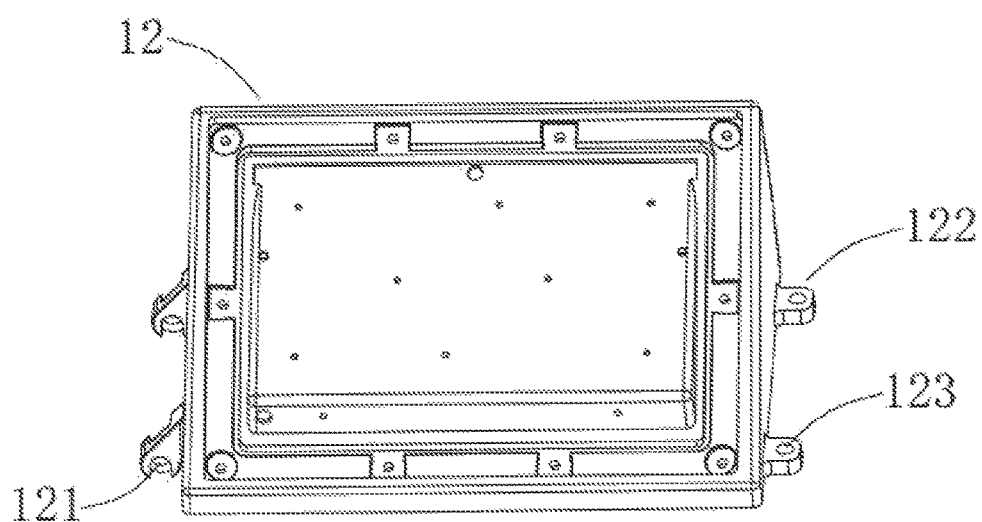
FIG. 4 is a schematic view of the top cover shown in FIG. 1.

Housing 1 includes base 11 and top cover 12, and base 11 is fixedly connected to top cover 12. A chamber is formed between base 11 and top cover 12. As shown in FIG. 3 and FIG. 4, base 11 is a cuboid housing with an opening at one end, and top cover 12 is a right-angled triangular prism-shaped housing with an opening at one side. Base 11 includes two side lugs 112 and two pins 111. Two side lugs 112 are located on the same side of base 11 and are disposed opposite to two pins 111. Top cover 12 includes two pin holes 121 and two outer edges 122. Two outer edges 122 are located on the same side of top cover 12 and are arranged opposite to two pin holes 121. Each side lug 112 is provided with first fitting hole 113, and each outer edge 122 is provided with second fitting hole 123 cooperated with first fitting hole 113. Two pins 111 are inserted into two pin holes 121, respectively. Bolts pass through first fitting holes 113 and second fitting holes 123 in turn, so as to realize the fixed connection of base 11 and top cover 12. Housing 1 further includes rubber pad 13 mounted between base 11 and top cover 12, so as to enhance the sealing between base 11 and top cover 12.

Power supply 2 includes 40 W high voltage power supply 21 and two 50 W power supplies 22. Two 50 W power supplies 22 are located on two sides of high voltage power supply 21, respectively. Power supply 2 is accommodated in housing 1 and is fixedly connected to housing 1 through L-shaped bracket 3.

Substrate 4 includes first substrate 41 and second substrate 42. An obtuse angle is formed between the plane where first substrate 41 is located and the plane where second substrate 42 is located. Substrate 4 is provided with a mounting hole, AND a screw passes through the mounting hole to fixedly connect substrate 4 to the outer surface of top cover 12. A plurality of light-emitting units 5 are mounted on one side of substrate 4. Each light-emitting unit 5 is an LED lamp, which is energy saving and environmental friendly and only occupies small space. The distance between the LED lamps on first substrate 41 is bigger than the distance between the LED lamps on second substrate 42, wherein light-emitting unit 5 on first substrate 41 is the main source of the wall lamp, and the LED lamps on second substrate 42 is used as a supplemental light source. Top cover 12 is provided with a wire hole, the power supply wires passes through the wire hole so as to electrically connect power supply 2 to base plate 4 for supplying power to the LED lamps on substrate 4.

Figure 5:
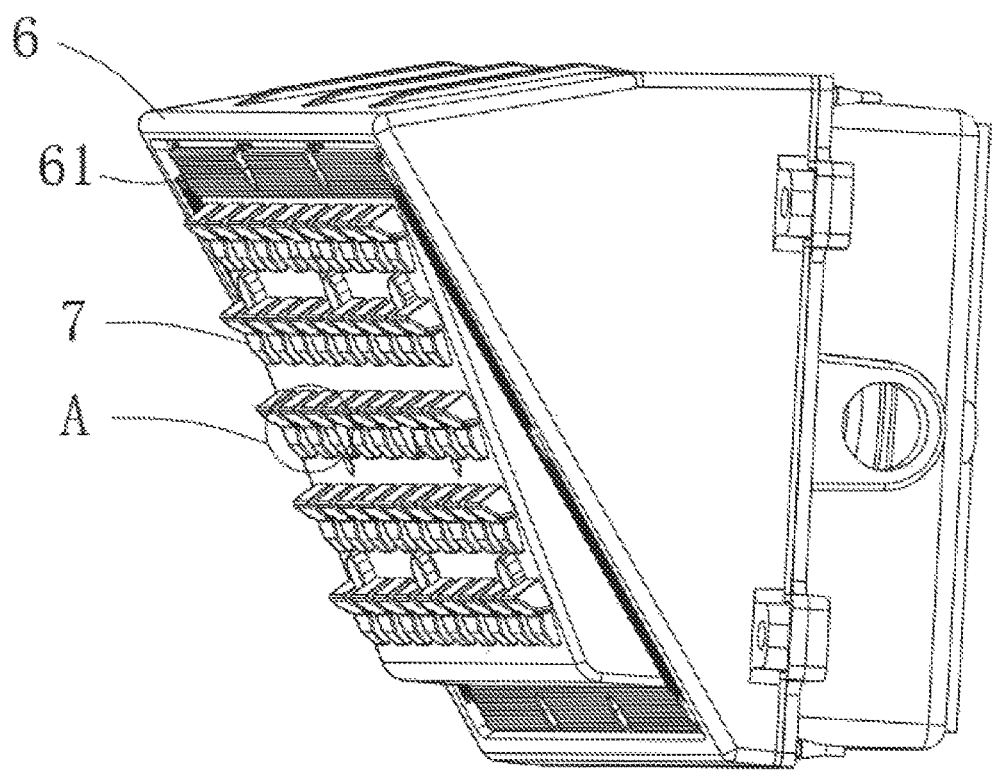
FIG. 5 is a schematic view that the wall lamp shown in FIG. 1 after being mounted on a wall.
Figure 6:
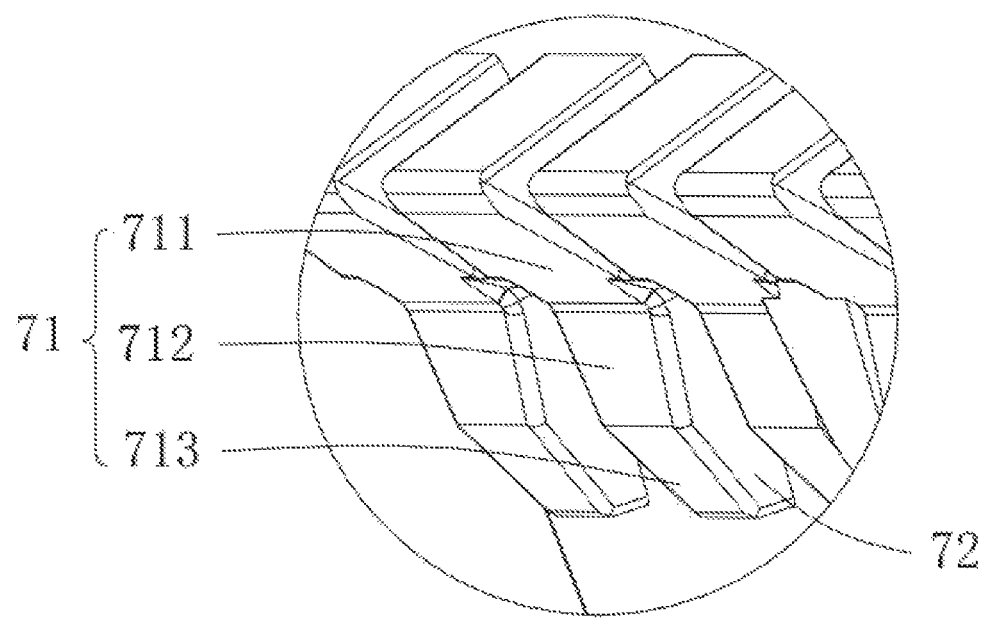
FIG. 6 is an enlarged view of the lens board shown in FIG. 5 at A.

Referring to FIG. 5 and FIG. 6, a plurality of lens units 7 are mounted on the outer surface of lens board 6 that is paralleled to first substrate 41, and the plurality of lens units 7 are arranged evenly in an array. One side of lens board 6 is provided with a mounting groove corresponding to each lens unit 7 for accommodating light-emitting unit 5. Annular protruded texture 61 is provided around lens board 6 to achieve light mixing effect, so that the light is soft and the glare is prevented. Each of lens units 7 includes a plurality of circumferential lens surfaces 72 and main lens surface 71. Circumferential lens surfaces 72 are connected one by one to form a circle. One end of circumferential lens surface 72 is connected to lens board 6, and the other end of circumferential lens surface 72 is connected to main lens surface 71. Main lens surface 71 includes first plane 711, second plane 712, and third plane 713. Second plane 712 is connected to first plane 711 and third plane 713. Second plane 712 is parallel to first substrate 41. First plane 711 and third plane 713 are inclined toward the ground. The downward inclination angle of first plane 711 is the same as that of second plane 712. In another embodiment, the downward inclination angle of first plane 711 differs from that of second plane 712.

After the wall lamp is fixed to the wall, lens board 6 is inclined with respect to the wall, and first plane 711, third plane 713, and lens board 6 are inclined in the same direction with respect to the wall. In addition, the inclination angle of first plane 711 is larger than that of lens board 6, the inclination angle of third plane 713 is larger or equal to the inclination angle of first plane 711, and second plane 712 is parallel to lens board 6. Lens unit 7 mounted on lens board 6 is matched with light-emitting unit 5 mounted on first substrate 41. A small portion of the light is emitted from circumferential lens surface 72, and most of the lights are emitted through main lens surface 71. Therefore, the light is concentrated and the convergence effect is good. In addition, since first plane 711 and third plane 713 are inclined toward the ground, most of the light is refracted by first plane 711 and third plane 713 and then projected toward the ground, so that the light energy scattered into the air is reduced, the utilization rate of the light energy in the wall lamp is increased, and a good illumination effect can be provided to the user.

It will be apparent to the ordinary person skilled in the art that various other changes and modifications can be made based on the technical solutions and concepts described above, and that all such changes and modifications are within the scope of the present invention as defined by the claims.

What is claimed is:

1. A wall lamp, which is mounted on a wall for illumination, comprising:
   a plurality of light-emitting units;
   a lens board; and
   a plurality of lens units,
   wherein
   the plurality of lens units are mounted on one side of the lens board, and a plurality of mounting grooves are provided on the other side of the lens board,
   the plurality of mounting grooves are provided corresponding to the plurality of lens units,
   the plurality of lens units are cooperated with the plurality of light-emitting units,
   the plurality of mounting grooves are provided for accommodating the plurality of light-emitting unit,
   each lens unit includes a main lens surface directly facing the light-emitting unit,
   the main lens surface includes a first plane, a second plane, and a third plane,
   the second plane connects the first plane and the third plane,
   the first plane, the third plane, and the lens board are inclined in the same direction with respect to the wall,
   an inclination angle of the first plane with respect to the wall is larger than that of the lens board,
   an inclination angle of the third plane with respect to the wall is larger than or equal to that of the first plane, and
   the second plane is parallel to the lens board.

2. The wall lamp according to claim 1, wherein the lens unit further includes a plurality of circumferential lens surfaces, the plurality of circumferential lens surfaces are connected one by one as a circle, one end of each circumferential lens surface is connected to the main lens surface, and the other end of each circumferential lens surface being fixedly connected to the lens board.

3. The wall lamp according to claim 1, wherein each light-emitting unit is an LED lamp.

4. The wall lamp according to claim 1, wherein the wall lamp further includes a substrate, the plurality of light-emitting units are evenly mounted on the substrate, the substrate includes a first substrate and a second substrate, the first substrate and the second substrate is connected at an obtuse angle, a surface of the lens board on which the plurality of lens units are mounted is parallel to the first substrate, and a distance between two adjacent light-emitting units mounted on the first substrate is larger than that on the second substrate.

5. The wall lamp according to claim 4, wherein the wall lamp further comprises a housing, the housing includes a top cover and a base, the base is fixedly connected to the top cover, the lens board is fixedly connected to the top cover, the substrate is connected to an outer surface of the top cover and located between the lens board and the top cover.

6. The wall lamp according to claim 5, wherein the base comprises two side lugs and two pins, the two side lugs and the two pins are disposed oppositely on two sides of the base, the top cover includes two outer edges and two pin holes, the two outer edges and the two pin holes are disposed oppositely on two sides of the top cover, the two pins are inserted to two pin holes, respectively, and the two side lugs are fixedly connected to the two outer edges by bolt, respectively.

7. The wall lamp according to claim 6, wherein the wall lamp further comprises a power supply, the power supply is electrically connected to the plurality of light-emitting units, the power supply is located within the housing and being fixedly connected to the housing via an L-shaped bracket.

8. The wall lamp according to claim 7, wherein the power supply includes a 40 W high voltage power supply and two 50 W power supplies, the two 50 W power supplies are located on two sides of the high voltage power supply, respectively.

9. The wall lamp according to claim 5, wherein the base includes a cuboid housing with an opening at one end, and the top cover is a right-angled triangular prism-shaped housing with an opening at one side.

10. The wall lamp according to claim 9, wherein the wall lamp further comprises a power supply, the power supply is electrically connected to the plurality of light-emitting units, the power supply is located within the housing and being fixedly connected to the housing via an L-shaped bracket.

11. The wall lamp according to claim 10, wherein the power supply includes a 40 W high voltage power supply and two 50 W power supplies, the two 50 W power supplies are located on both sides of the high voltage power supply, respectively.

12. The wall lamp according to claim 5, wherein the housing further comprises a rubber pad mounted between the base and the top cover.

13. The wall lamp according to claim 12, wherein the wall lamp further comprises a power supply, the power supply is electrically connected to the plurality of light-emitting units, the power supply is located within the housing and being fixedly connected to the housing via an L-shaped bracket.

14. The wall lamp according to claim 13, wherein the power supply includes a 40 W high voltage power supply and two 50 W power supplies, the two 50 W power supplies are located on both sides of the high voltage power supply, respectively.

15. The wall lamp according to claim 5, wherein the wall lamp further comprises a power supply, the power supply is electrically connected to the plurality of light-emitting units, the power supply is located within the housing and fixedly connected to the housing via an L-shaped bracket.

16. The wall lamp according to claim 15, wherein the power supply includes a 40 W high voltage power supply and two 50 W power supplies, the two 50 W power supplies are located on two sides of the high voltage power supply, respectively.

* * * * *